(12) United States Patent
Kawabata (10) Patent No.: US 10,173,584 B2
(45) Date of Patent: Jan. 8, 2019

(54) VEHICLE LAMP

(71) Applicant: Stanley Electric Co., Ltd., Tokyo (JP)

(72) Inventor: Mari Kawabata, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/458,691

(22) Filed: Mar. 14, 2017

(65) Prior Publication Data

US 2017/0276315 A1     Sep. 28, 2017

(30) Foreign Application Priority Data

Mar. 24, 2016     (JP) ................... 2016-059947

(51) Int. Cl.
| | | |
|---|---|---|
| *B60Q 1/30* | (2006.01) | |
| *F21V 8/00* | (2006.01) | |
| *F21S 43/14* | (2018.01) | |
| *F21S 43/20* | (2018.01) | |
| *F21S 43/31* | (2018.01) | |

(Continued)

(52) U.S. Cl.
CPC ................ *B60Q 1/30* (2013.01); *F21S 43/14* (2018.01); *F21S 43/239* (2018.01); *F21S 43/241* (2018.01); *F21S 43/243* (2018.01); *F21S 43/249* (2018.01); *F21S 43/26* (2018.01); *F21S 43/31* (2018.01); *G02B 6/002* (2013.01); *F21Y 2103/10* (2016.08); *F21Y 2113/13* (2016.08); *F21Y 2115/10* (2016.08)

(58) Field of Classification Search
CPC .. F21S 48/2243; F21S 48/215; F21S 48/2212; F21S 48/225; F21S 48/2262; F21S 48/2281; F21S 48/234; G02B 6/002
See application file for complete search history.

(56) References Cited

U.S. PATENT DOCUMENTS

2002/0141174 A1* 10/2002 Parker ................... A61M 21/02
                                                                                  362/612
2004/0130912 A1     7/2004 Miyashita
(Continued)

FOREIGN PATENT DOCUMENTS

| DE | 102011090197 A1 | 7/2013 |
|---|---|---|
| EP | 2548769 A1 | 1/2013 |

(Continued)

OTHER PUBLICATIONS

The extended European Search Report for the related European Patent Application No. 17160964.7 dated Sep. 7, 2017.

*Primary Examiner* — Alexander K Garlen (74) *Attorney, Agent, or Firm* — Kenealy Vaidya LLP (57) ABSTRACT

A vehicle lamp includes a plurality of light sources and a light guide plate, the plurality of light sources are disposed in parallel along one end surface of the light guide plate, the light guide plate has a light reflection section formed at a first surface of the light guide plate and configured to reflect light entered from the one end surface toward a second surface of the light guide plate, the light reflection section includes a plurality of parabolic reflection surfaces, and the parabolic reflection surfaces protrude from the first surface and have shapes curved along a direction in which the light entering from the one end surface advances and a direction crossing with the direction in which the light entering from the one end surface advances.

21 Claims, 9 Drawing Sheets

(51) Int. Cl.
*F21S 43/239* (2018.01)
*F21S 43/241* (2018.01)
*F21S 43/243* (2018.01)
*F21S 43/249* (2018.01)
*F21Y 103/10* (2016.01)
*F21Y 113/13* (2016.01)
*F21Y 115/10* (2016.01)

(56) References Cited

U.S. PATENT DOCUMENTS

| | | | | |
|---|---|---|---|---|
| 2006/0062016 A1* | 3/2006 | Dejima | ............... | G02B 6/002 |
| | | | | 362/600 |
| 2006/0083013 A1* | 4/2006 | Wanninger | ........... | F21S 48/1154 |
| | | | | 362/509 |
| 2007/0297191 A1* | 12/2007 | Sampsell | ............ | G02B 6/0018 |
| | | | | 362/602 |
| 2008/0062686 A1* | 3/2008 | Hoelen | ............... | G02B 6/002 |
| | | | | 362/240 |
| 2009/0135621 A1* | 5/2009 | Muegge | ............... | F21S 48/215 |
| | | | | 362/516 |
| 2010/0048085 A1* | 2/2010 | Kayanuma | .......... | G02B 6/0018 |
| | | | | 445/23 |
| 2011/0286237 A1* | 11/2011 | Tanoue | ............... | G02B 6/0016 |
| | | | | 362/606 |
| 2013/0242614 A1* | 9/2013 | Kurata | ............... | G02B 6/0028 |
| | | | | 362/619 |
| 2014/0022814 A1* | 1/2014 | Kurata | ............... | G02B 6/0016 |
| | | | | 362/606 |
| 2014/0241009 A1* | 8/2014 | Kunimochi | ............ | G02B 6/002 |
| | | | | 362/628 |
| 2015/0160395 A1 | 6/2015 | Sahlhoff et al. | | |
| 2015/0226908 A1* | 8/2015 | Kunimochi | ............ | G02B 6/0046 |
| | | | | 362/612 |
| 2016/0018582 A1* | 1/2016 | Fiorentino | ............ | G02B 6/0018 |
| | | | | 362/609 |

FOREIGN PATENT DOCUMENTS

| | | |
|---|---|---|
| JP | 2006-93104 A | 4/2006 |
| JP | 2012-169116 A | 9/2012 |
| WO | 2014142851 A1 | 9/2014 |

\* cited by examiner

VEHICLE LAMP

CROSS-REFERENCE TO RELATED APPLICATION

Priority is claimed on Japanese Patent Application No. 2016-059947, filed Mar. 24, 2016, the content of which is incorporated herein by reference.

BACKGROUND

Field of the Invention

The present invention relates to a vehicle lamp.

Description of Related Art

In the related art, as a vehicle lamp mounted on a vehicle, a lamp in which a light source such as a light emitting diode (LED) or the like and a plate-shaped light guide member (a light guide plate) are combined is known (for example, see Japanese Unexamined Patent Application, First Publication No. 2012-169116 and Japanese Unexamined Patent Application, First Publication No. 2006-93104).

The light guide plate allows light emitted from the light source to enter from one end surface (an incident surface), reflects the light by using a plurality of reflection cuts formed at one main surface (a reflection surface), and then allows the light to exit from the other main surface (the light emission surface) to the outside. Accordingly, the light can be emitted from the light emitting surface formed at a front surface of the light guide plate while the light from the light source is guided inside of the light guide plate. Such a vehicle lamp is used for, for example, a tail lamp or the like of a vehicle.

SUMMARY

Incidentally, the above-mentioned LED has a merit of reducing power consumption while providing a long lifetime. For this reason, in vehicle lamps in recent times, with advances in increased luminance of LEDs and reduction in cost, light sources adopting LEDs are gradually increasing.

However, while an LED has high directivity (straightness), the light is not easily diffused. For this reason, in the above-mentioned vehicle lamp, when the plurality of LEDs are disposed in parallel along an incident surface of the light guide plate, so-called luminance (emission) nonuniformity in which portions of the light emitting surface of the light guide plate corresponding to positions of the LEDs glow strongly in a linear pattern may occur.

In the vehicle lamp, since visibility and appearance are deteriorated when such luminance nonuniformity occurs, a portion (a light diffuser) configured to diffuse light is installed at the light guide plate to reduce luminance nonuniformity.

In addition, in a vehicle lamp, using LEDs in the light source can achieve reduction in size. Meanwhile, in thinning a vehicle lamp, for example, in comparison with a configuration in which a light source is disposed to oppose an incident surface parallel to a light emission surface of a light guide plate as in the invention disclosed in Japanese Unexamined Patent Application, First Publication No. 2012-169116, a configuration in which a light source is disposed to oppose an incident surface perpendicular to a light emission surface of a light guide plate as in the invention disclosed in Japanese Unexamined Patent Application, First Publication No. 2006-93104 is advantageous.

However, in the case of the latter configuration, an optical axis of the light entering an end surface of the light guide plate from the light source and both main surfaces of the light guide plate are parallel to each other. In this case, the conditions for reflecting (totally reflection) the light entering the end surface of the light guide plate from the light source at the main surfaces of the light guide plate becomes stringent. Accordingly, the more the thickness of the light guide plate is reduced, the more difficult it becomes to guide the light efficiently while repeatedly reflecting the light from the light source inside the light guide plate.

Here, in the invention disclosed in Japanese Unexamined Patent Application, First Publication No. 2006-93104, as an incoming light body optically connected to one end portion of the light guide plate is provided and the light entering body is configured as an elliptical section including an elliptical cross-sectional shape, the light from the light source is guided into the light guide plate.

However, the invention disclosed in Japanese Unexamined Patent Application, First Publication No. 2006-93104 is a technology applied to a lighting device such as a display device or the like. For this reason, the above-mentioned light diffusion unit is not installed at the light guide plate but is configured to diffuse the light emitted from the light guide plate by the light diffusion sheet stacked on the light guide plate. In addition, high output LEDs such as vehicle lamps are not used for a light source for a lighting device.

An aspect of the present invention is directed to providing a vehicle lamp capable of efficiently guiding light from a light source into a light guide plate and further suppressing occurrence of luminance nonuniformity.

A vehicle lamp according to an aspect of the present invention includes a plurality of light sources; and a light guide plate configured to guide light from the plurality of light sources, wherein the plurality of light sources are disposed in parallel along one end surface of the light guide plate, the light guide plate has a first surface, a second surface, and a light reflection section formed at the first surface and configured to reflect light entered from the one end surface toward the second surface, the light reflection section comprises a plurality of parabolic reflection surfaces arranged to respectively correspond to the plurality of light sources, and the parabolic reflection surfaces protrude from the first surface of the light guide plate and have shapes curved along a direction in which light entering from the one end surface advances and curved along a direction crossing with the direction in which the light entering from the one end surface advances.

In the above-mentioned configuration, as the plurality of light sources are disposed in parallel along the one end surface of the light guide plate, reduction in thickness (reduction in size) of the vehicle lamp can be achieved. In addition, the light entering the one end surface from the light sources can be efficiently guided by the plurality of parabolic reflection surfaces arranged to respectively correspond to each of the plurality of light sources while being repeatedly reflected inside the light guide plate. Further, the light entering the one end surface from the light sources can be diffused in the direction crossing with the direction in which the light advances by the plurality of parabolic reflection surfaces. Accordingly, occurrence of luminance (emission) nonuniformity can be suppressed compared to a case when the plurality of light sources is disposed in parallel.

In addition, in the above-mentioned vehicle lamp, a center of an optical axis of the light source facing the one end surface of the light guide plate and the first surface of the light guide plate may be disposed at levels close to each other with respect to a predetermined direction crossing with the direction in which the light advances.

In the above-mentioned configuration, among the light emitted from the light source, the light emitted toward the parabolic reflection surface with the center of the optical axis being interposed therebetween is reflected in the direction in which the light advances by the parabolic reflection surface. Meanwhile, the light emitted toward the opposite side of the parabolic reflection surface is reflected toward the parabolic reflection surface by the surface facing the parabolic reflection surface and then reflected in the direction in which the light advances by the parabolic reflection surface. Accordingly, the light entering the one end surface from the light source can be efficiently guided while being repeatedly reflected inside the light guide plate.

In addition, in the above-mentioned vehicle lamp, the parabolic reflection surface may have a shape in which a downward gradient is gentler than an upward gradient in the direction in which the light advances.

In the above-mentioned configuration, the light entering the parabolic reflection surface can be efficiently reflected.

In addition, in the above-mentioned vehicle lamp, the light reflection section may include an inclined reflection surface configured to connect the parabolic reflection surface and the first surface of the light guide plate.

In the above-mentioned configuration, the light entering the inclined reflection surface can be efficiently reflected.

In addition, in the above-mentioned vehicle lamp, the parabolic reflection surface may have a light diffuser configured to diffuse light in a direction crossing with the direction in which the light advances.

In the above-mentioned configuration, the light entering the parabolic reflection surface can be further diffused by the light diffuser in the direction crossing with the direction in which the light advances.

In addition, in the above-mentioned vehicle lamp, the light diffuser may include a plurality of concave stripe sections extending in the direction in which the light advances, and the plurality of concave stripe sections may be formed in parallel in a direction crossing with the direction in which the light advances.

In the above-mentioned configuration, the light entering the parabolic reflection surface can be efficiently diffused by the plurality of concave stripe sections in the direction crossing the direction in which the light advances.

In addition, in the above-mentioned vehicle lamp, the plurality of parabolic reflection surfaces may be disposed in a state in which a part of the parabolic reflection surfaces overlap each other in a direction crossing with the direction in which the light advances.

In the above-mentioned configuration, the interval of the neighboring light sources can be narrowed. In addition, occurrence of luminance (emission) nonuniformity can be suppressed in this case as well.

In addition, in the above-mentioned vehicle lamp, the plurality of parabolic reflection surfaces may be formed at the first surface and the second surface of the light guide plate, the plurality of light sources may include a plurality of first light sources and a plurality of second light sources, a center of an optical axis of the plurality of first light sources facing the one end surface of the light guide plate and the first surface of the light guide plate may be disposed at levels close to each other with respect to the predetermined direction crossing with the direction in which the light advances, a center of an optical axis of the plurality of second light sources facing the one end surface of the light guide plate and the second surface of the light guide plate may be disposed at levels close to each other with respect to the predetermined direction crossing with the direction in which the light advances, and the first light sources and the second light sources may be disposed in parallel to each other in a direction along the one end surface of the light guide plate.

In the above-mentioned configuration, the number of the light sources disposed along the one end surface of the light guide plate can be increased. In addition, the light entering the one end surface from the first light sources and the second light sources can be efficiently guided while being repeatedly reflected in the light guide plate in this case as well. Further, occurrence of luminance (emission) nonuniformity can be suppressed compared to a case when the plurality of light sources is disposed in parallel.

In addition, in the above-mentioned vehicle lamp, the first light source and the second light source may emit light having different colors with each other.

In the above-mentioned configuration, as lighting of the first light sources and lighting of the second light sources are switched with each other, lighting in different colors can be performed.

In addition, in the above-mentioned vehicle lamp, the plurality of light sources may be disposed with intervals between the one end surface of the light guide plate and the light sources.

In the above-mentioned configuration, a high output light source can be used and influence of heat emitted from the light source on the light guide plate can be avoided.

According to the aspect of the present invention, it is possible to provide the vehicle lamp capable of efficiently guiding the light from the light source into the light guide plate, and further, suppressing occurrence of luminance (emission) nonuniformity.

DESCRIPTION OF EMBODIMENTS

Hereinafter, an embodiment of the present invention will be described in detail with reference to the accompanying drawings.

Further, in the drawings used in the following description, different dimensional scales of the components may be shown so that the components can be easily seen, and the dimensional ratios and the like of the components are not always shown as same in reality.

Figure 1:
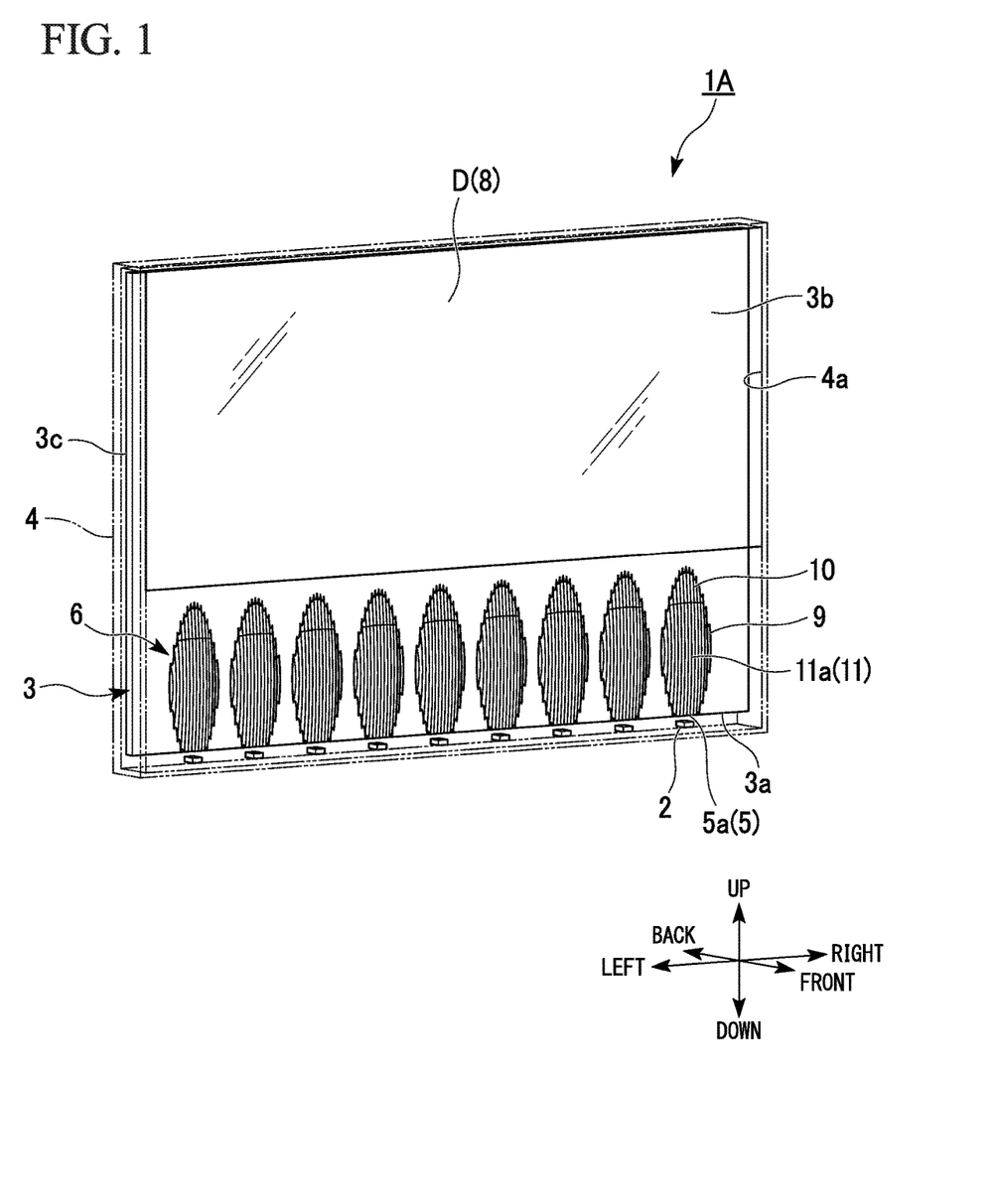
FIG. 1 is a perspective view showing the exterior of a vehicle lamp according to an embodiment of the present invention.
Figure 2:
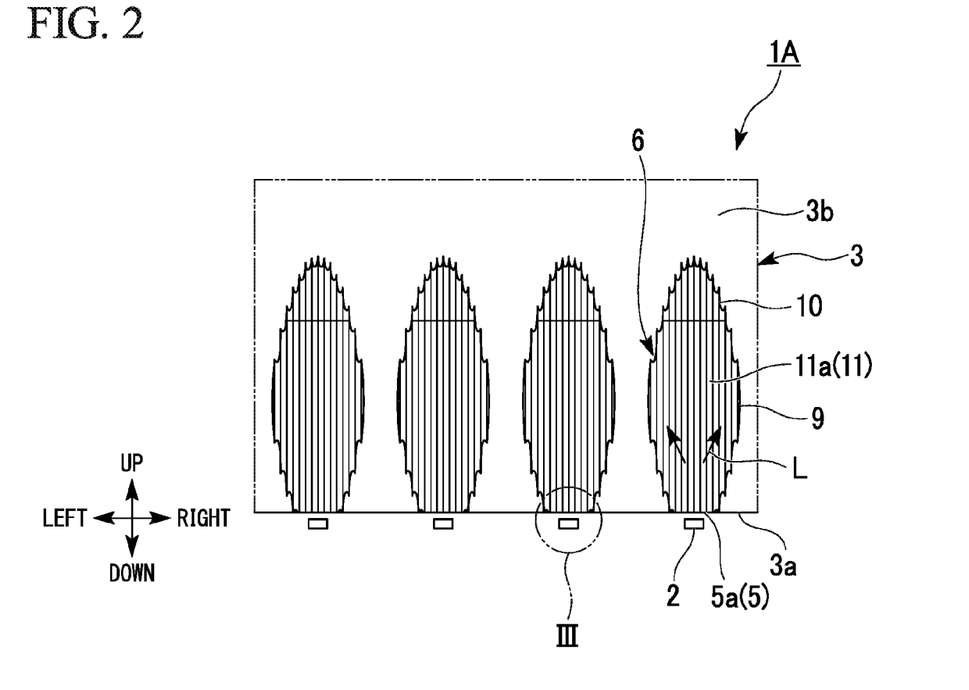
FIG. 2 is a plan view of a major part showing a configuration of the vehicle lamp shown in FIG. 1.
Figure 3:
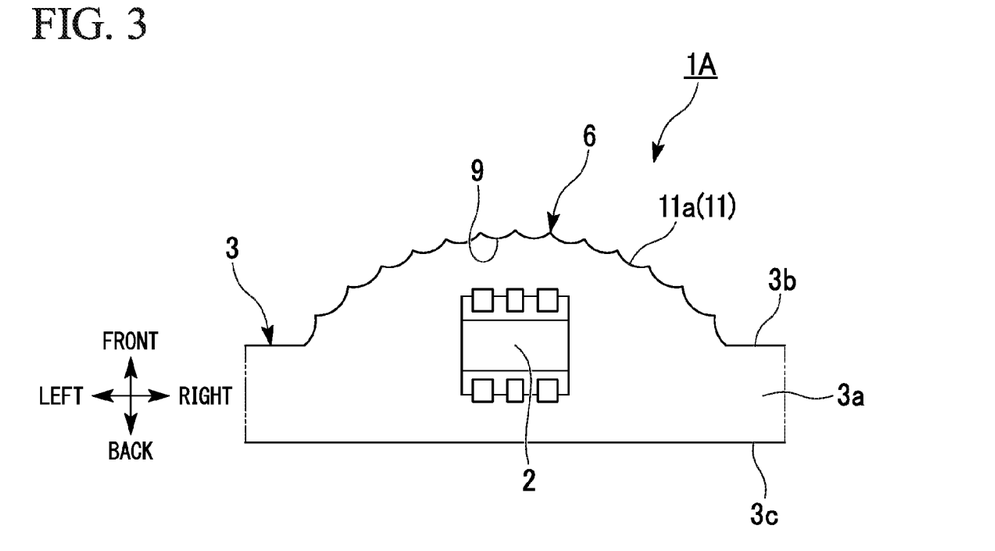
FIG. 3 is an enlarged end view showing an enclosed portion III shown in FIG. 2.
Figure 4:
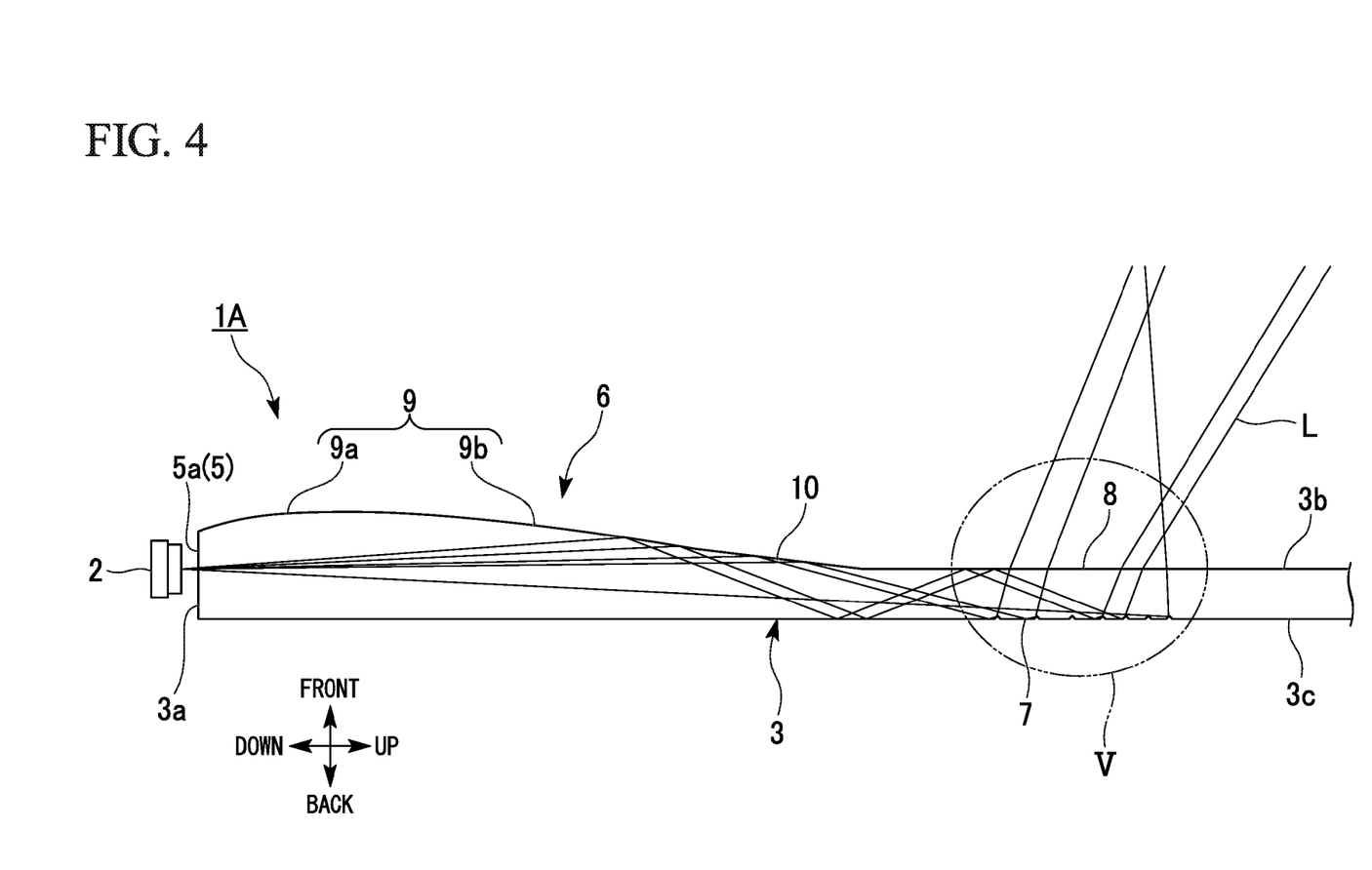
FIG. 4 is a light path diagram showing a configuration of the vehicle lamp shown in FIG. 1.
Figure 5:
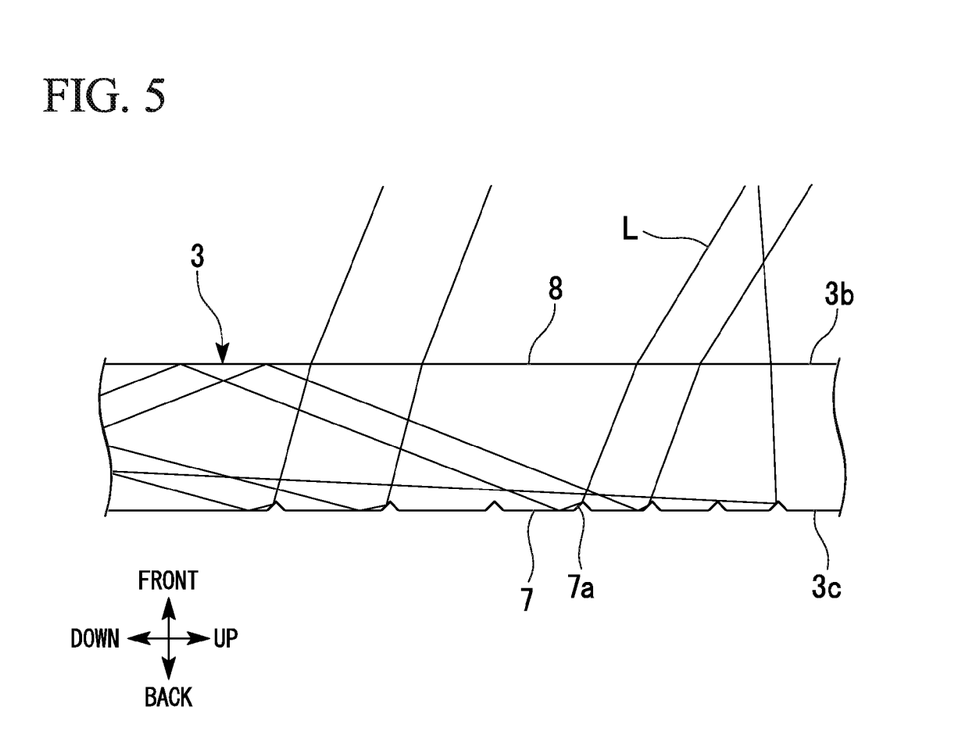
FIG. 5 is an enlarged light path diagram of an enclosed portion V shown in FIG. 4.

As an embodiment of the present invention, for example, a vehicle lamp 1A shown in FIGS. 1 to 5 will be described. Further, FIG. 1 is a perspective view showing the exterior of the vehicle lamp 1A. FIG. 2 is a plan view of a major part showing a configuration of the vehicle lamp 1A. FIG. 3 is an enlarged end view of an enclosed portion III shown in FIG. 2. FIG. 4 is a light path diagram showing a configuration of the vehicle lamp 1A. FIG. 5 is an enlarged light path diagram showing an enclosed portion V shown in FIG. 4.

As shown in FIG. 1 to FIG. 5, the vehicle lamp 1A of the embodiment is, for example, a tail lamp mounted at both ends of a back section of a vehicle (not shown) to which the present invention is applied. Further, in the following description, the words "front," "back," "left," "right," "up" and "down" refer to directions when the vehicle lamp 1A is seen from a front surface (a back side of the vehicle) unless specifically stated otherwise.

Accordingly, directions when the vehicle is seen from the front surface (a front side of the vehicle) are directions in which front, back, left and right are reversed.

Specifically, as shown in FIG. 1, the vehicle lamp 1A of the embodiment includes a plurality of light sources 2 and a light guide plate 3, and has a structure in which the plurality of light sources 2 and the light guide plate 3 are held (stored) inside a casing 4 which is referred to as an extension. The casing 4, which has a light shielding property, has an opening section 4a with a predetermined shape (in the embodiment, a rectangular shape) causing a light emitting surface D formed at a front surface 3b of the light guide plate 3 to face in an outward direction (a forward direction).

As shown in FIG. 1, FIG. 2 and FIG. 4, the plurality of light sources 2 are LED modules in which LEDs are mounted in packages. LEDs configured to emit red light (hereinafter, simply referred to as light) are used in the LED module. In addition, high output type LEDs for the lighting of the vehicle are used as the LEDs. The light sources 2 radially emit the light L radiated from the LED module in directions parallel to each other (hereinafter referred to as directions in which the light L advances, or an extending direction of an optical axis Ax of the light source 2). Further, emission elements such as laser diodes (LDs) or the like may be used in the light sources 2 in addition to the above-mentioned LEDs.

The plurality of light sources 2 is disposed along one end surface (in the embodiment, a lower end surface 3a) of the light guide plate 3 in a leftward/rightward direction at equal intervals. In addition, the light sources 2 are disposed at intervals between the lower end surface 3a of the light guide plate 3 and the light sources 2. Accordingly, since the light sources 2 do not come in direct contact with the light guide plate 3, the influence of heat emitted from the light sources 2 to the light guide plate 3 can be avoided.

The light guide plate 3 is a transparent material formed in a substantially rectangular flat plate shape as a whole. A material having a higher refractive index than air, for example, a transparent resin such as polycarbonate, acryl, or the like, glass, or the like, may be used in the light guide plate 3.

Specifically, as shown in FIG. 1 to FIG. 5, the light guide plate 3 has a light incidence section 5, a light reflection section 6, a reflection surface 7 and a light emission surface 8. The light guide plate 3 has a first surface and a second surface extending in a direction in which the light L advances.

The light incidence section 5 has a plurality of incident surfaces 5a disposed at the lower end surface 3a of the light guide plate 3 and arranged to respectively face the plurality of light sources 2. The light L emitted from the light sources 2 enters inside of the light guide plate 3 from the incident surfaces 5a. For this reason, each of the incident surfaces 5a have an area sufficient to allow the light L radially emitted from the light sources 2 to enter the incident surfaces 5a at the lower end surface 3a of the light guide plate 3. That is, as shown in FIG. 3, the respective light sources 2 are disposed so as to be positioned inside of the respective incident surfaces 5a when seen from the lower end surface 3a side of the light guide plate 3.

As shown in FIG. 1 to FIG. 4, the light reflection section 6 is installed at either of one main surface and the other main surface (in the embodiment, the front surface 3b) side of the light guide plate 3. The light reflection section 6 is formed at a first surface (in the embodiment, the front surface 3b) of the light guide plate 3. Specifically, the light reflection section 6 has a plurality of parabolic reflection surfaces 9 formed at positions along the lower end surface 3a of the light guide plate 3 while corresponding to the respective plurality of light sources 2.

The plurality of parabolic reflection surfaces 9 are disposed in the leftward/rightward direction of the light guide plate 3 to correspond to the respective incident surfaces 5a of the light incidence section 5 at equal intervals. In addition, each of the parabolic reflection surfaces 9 are formed at positions which contacts with the incident surfaces 5a.

The parabolic reflection surface 9 has a shape protruding from the front surface 3b of the light guide plate 3, and curved along the direction in which the light L entering from the incident surface 5a advances (in the embodiment, an upward/downward direction of the light guide plate 3) and curved along a direction crossing with the direction in which the light L entering from the incident surfaces 5a advances (in the embodiment, the leftward/rightward direction of the light guide plate 3).

The parabolic reflection surface 9 is formed by protruding forward than the front surface 3b of the light guide plate 3. The parabolic reflection surface 9 has a surface form which is curved along the extending direction of the optical axis Ax of the light source 2 and curved along a direction that crosses with the extending direction of the optical axis Ax.

The parabolic reflection surface 9 is formed in a convex shape having a curvature toward the front direction.

In addition, the parabolic reflection surfaces 9 have parabolic surface shapes in which a downward gradient 9b is gentler than a upward gradient 9a in the direction in which the light L advances.

The parabolic reflection surfaces 9 (totally) reflect the light L entering from the incident surfaces 5a toward the other main surface or the one main surface (in the embodiment, a back surface 3c) of the light guide plate 3. The parabolic reflection surfaces 9 (totally) reflect the light L entering from the incident surfaces 5a toward a second surface (in the embodiment, the back surface 3c) of the light guide plate 3. In addition, in the light reflection section 6, the light L is guided toward the reflection surface 7 in the direction in which the light L advances while the light L entering from the incident surfaces 5a in the light guide plate 3 is repeatedly reflected between the parabolic reflection surfaces 9 and the back surface 3c of the light guide plate 3 facing the parabolic reflection surfaces 9.

Here, a shape of the parabolic reflection surfaces 9 in the direction in which the light L advances will be described with reference to FIG. 6. Further, FIG. 6(a) is a schematic view showing shapes of the parabolic reflection surfaces 9. FIG. 6(b) is a light path diagram of the light L reflected by the parabolic reflection surfaces 9.

Figure 6:
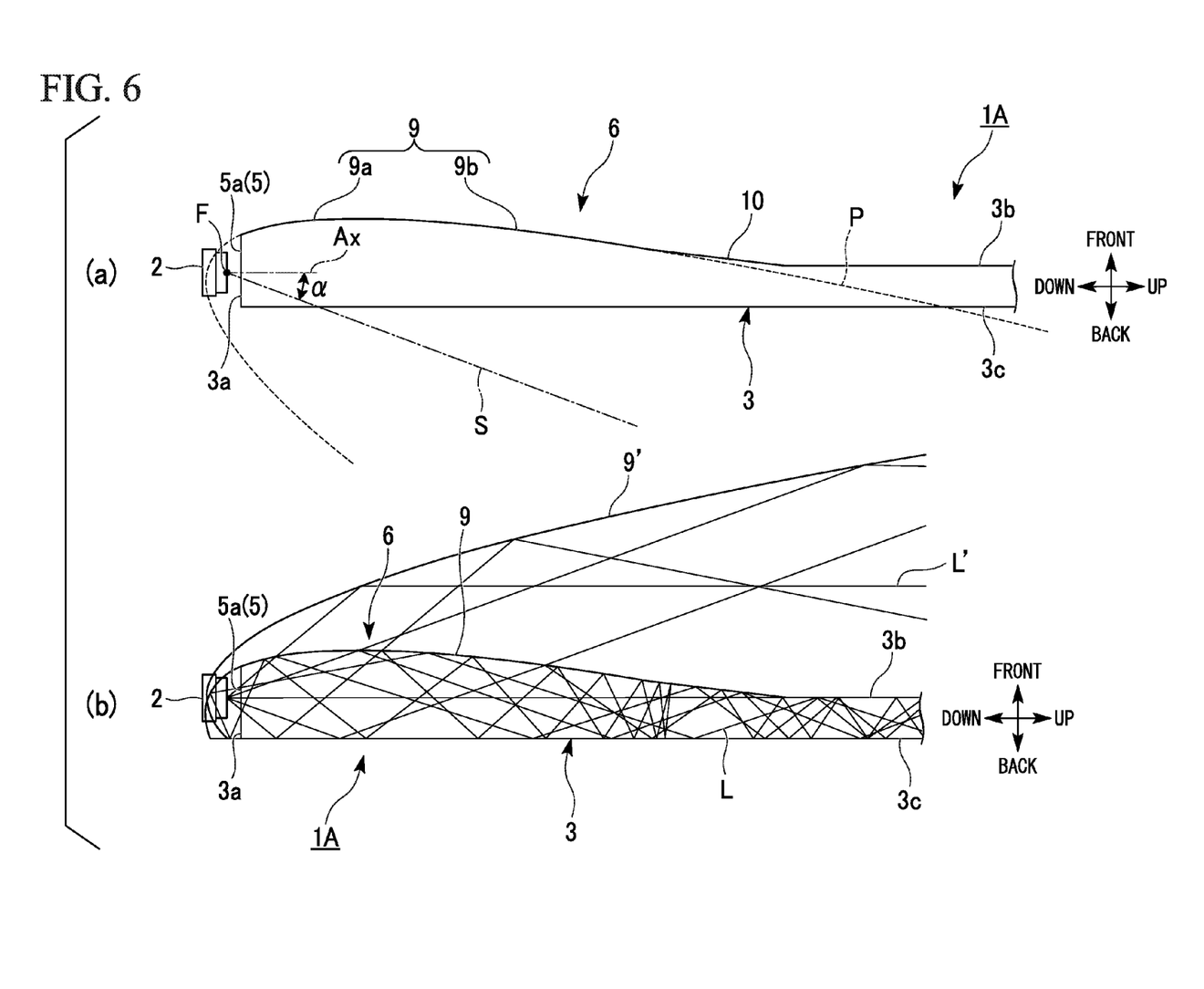
FIG. 6 is a view for explaining the shape of a parabolic reflection surface.

As shown in FIG. 6(a), a symmetrical axis S of a parabolic transition curve P which uses a center (an emission point) of the light sources 2 as a focus F is inclined with respect to a direction, which is parallel to the main surface (the front surface 3b, the first surface) provided at the side at which the parabolic reflection surface 9 of the light guide plate 3 is formed, at an angle α toward a side opposite to a side at which the parabolic reflection surfaces 9 is formed with respect to an optical axis Ax of the light sources 2.

Further, in the embodiment, for example, the parabolic reflection surfaces 9 have a shape in which a thickness of the light guide plate 3 is 3 mm, a focal distance (f) is 1.5 mm and the symmetrical axis S of the parabolic transition curve P is inclined with respect to the light source 2 at α=22°.

In this case, as the angle at which the parabolic transition curve P is inclined is increased, a ratio of the parabolic reflection surface 9 that occupies the front surface 3b of the light guide plate 3 is reduced. However, in order to totally reflect main light emitted from the light source 2 (light equal to or smaller than a half-value angle of 30°) one time or more at the parabolic reflection surface 9, in the case of f=1.5 mm, it is preferable to satisfy α≤22°.

In addition, when f is increased, while intervals at which the light sources 2 are disposed are increased, a ratio of the parabolic reflection surface 9 that occupies the front surface 3b of the light guide plate 3 is increased. In addition, intervals between the light source 2 and the incident surface 5a are also increased. For this reason, it is needed to adjust the intervals. For example, when the intervals are 15 mm, it is preferable to set f equal to or larger than 1.5 mm, and when the intervals are 30 mm, it is preferable to set f equal to or larger than 3 mm.

Accordingly, the parabolic reflection surfaces 9 can have parabolic surface shapes in which the gradient of the downward gradient 9b is gentler than the upward gradient 9a in the direction in which the light L advances. In this case, as shown in FIG. 6(b), the light can be guided toward the reflection surface 7 while the light L entering from the incident surface 5a is repeatedly reflected at the light reflection section 6.

Meanwhile, when a parabolic reflection surface 9' in which the symmetrical axis S of the parabolic transition curve P is parallel to the front surface 3b of the light guide plate 3, light L' entering the parabolic reflection surface 9' is reflected in a diverging direction without being reflected in a converging direction inside the light guide plate 3.

Figure 7:
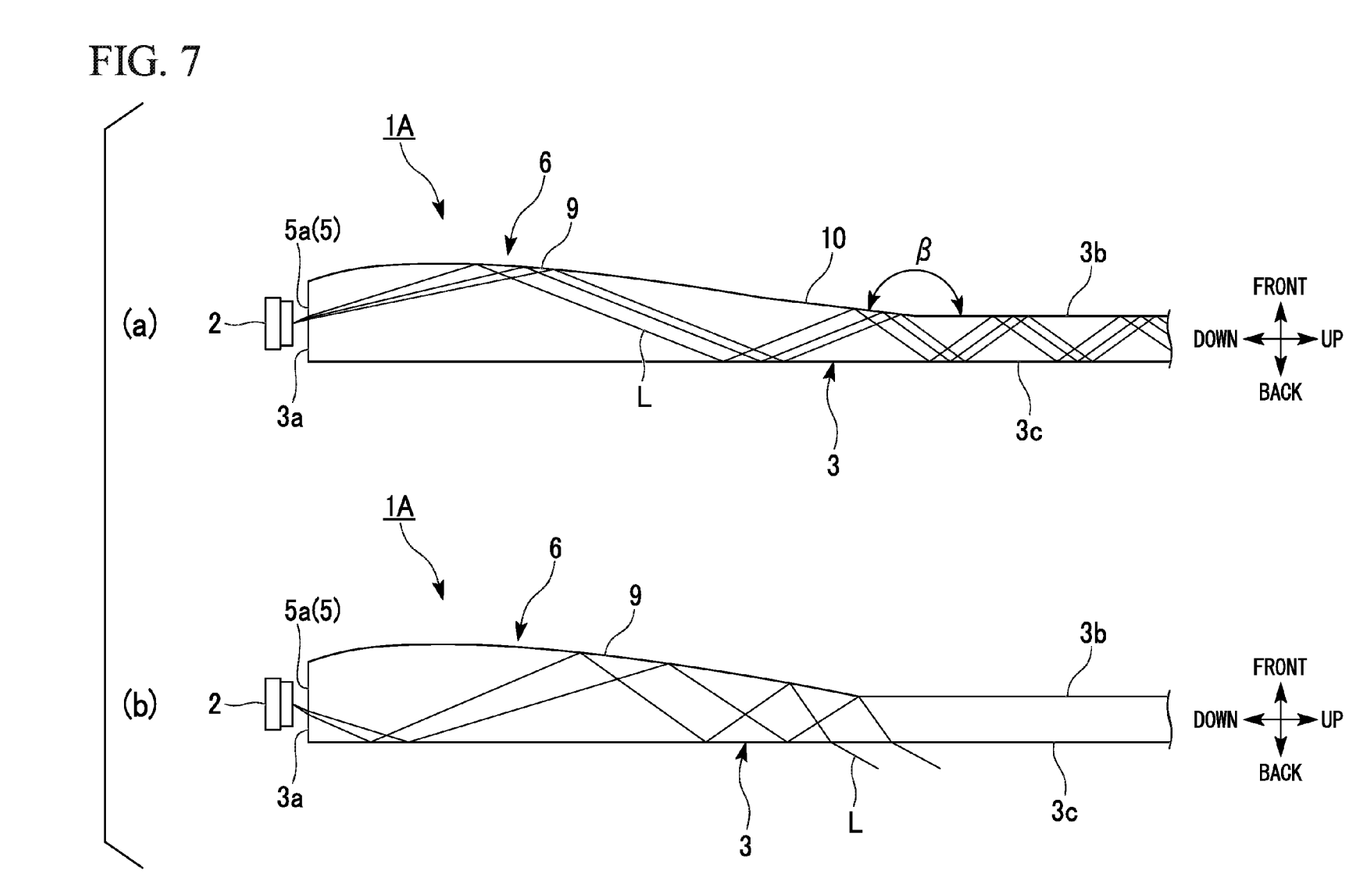
FIG. 7 is a view for explaining the shape of an inclined reflection surface.

As shown in FIG. 1, FIG. 2 and FIG. 4, the light reflection section 6 has an inclined reflection surface 10 configured to connect the parabolic reflection surface 9 and the front surface 3b of the light guide plate 3. A shape of the inclined reflection surface 10 will be described with reference to FIGS. 7(a) and 7(b). Further, FIG. 7(a) is a light path diagram showing the case in which the inclined reflection surface 10 is provided. FIG. 7(b) is a light path diagram showing the case in which the inclined reflection surface 10 is omitted.

As shown in FIG. 7(a), the inclined reflection surface 10 constitutes a surface in which an angle is gentler than the downward gradient 9b of the parabolic reflection surface 9. Accordingly, the light L entering the inclined reflection surface 10 can be efficiently reflected toward the reflection surface 7.

Meanwhile, when the inclined reflection surface 10 is omitted and the parabolic reflection surface 9 of the light guide plate 3 are directly connected to the front surface 3b, as shown in FIG. 7(b), the light L reflected at the parabolic reflection surface 9 is emitted from the back surface 3c to the outside of the light guide plate 3 depending on an angle of the downward gradient 9b of the parabolic reflection surface 9 without being reflected at the back surface 3c which faces the parabolic reflection surface 9.

Accordingly, in the vehicle lamp 1A of the embodiment, while the inclined reflection surface 10 may not be a necessary configuration, it is preferable that the inclined reflection surface 10 is disposed between the parabolic reflection surface 9 and the front surface 3b of the light guide plate 3 at an appropriate angle, according to necessity. Further, in the embodiment, an angle β of the inclined reflection surface 10 is set to, for example, 173.2° with respect to the front surface 3b of the light guide plate 3.

As shown in FIG. 1 to FIG. 3, the parabolic reflection surfaces 9 and the inclined reflection surface 10 have a light diffuser 11 configured to diffuse light in a direction crossing with the direction in which the light L advances (a leftward/rightward direction of the light guide plate 3, a direction crossing with the extending direction of the optical axis Ax). The light diffuser 11 has a plurality of concave stripe sections 11a extending in the direction in which the light L advances (the upward/downward direction of the light guide plate 3, the extending direction of the optical axis Ax). In addition, the plurality of concave stripe sections 11a are formed in parallel in a direction crossing with the direction in which the light L advances (the leftward/rightward direction of the light guide plate 3, a direction crossing with the extending direction of the optical axis Ax). The concave stripe sections 11a are referred as flute cuts and have a concave surface shape of a substantially arc-shaped cross section. Further, in the embodiment, intervals of the neighboring concave stripe sections 11a are 0.5 to 2 mm, and curvatures of the concave stripe sections 11a are 0.6 to 4 mm.

Further, the concave stripe sections 11a are not limited to the above-mentioned shapes buy may have a shapes that diffuse the light L in the direction crossing with the direction in which the light L advances (the leftward/rightward direction of the light guide plate 3, a direction crossing with the extending direction of the optical axis Ax), and shapes, sizes, numbers, or the like, thereof may be appropriately modified.

In the light reflection section 6, the light L entering the parabolic reflection surface 9 can be diffused in the direction crossing with the direction in which the light advances (the leftward/rightward direction of the light guide plate 3, a direction crossing with the extending direction of the optical axis Ax) by the shape of the parabolic reflection surface 9 curved along the direction crossing with the direction in which the light L advances (the leftward/rightward direction of the light guide plate 3, a direction crossing with the extending direction of the optical axis Ax). In the light reflection section 6, the light L entering the parabolic reflection surface 9 can be diffused in the direction crossing with the extending direction of the optical axis Ax by the shape of the parabolic reflection surface 9 curved along the direction crossing with the extending direction of the optical axis Ax. Further, the light L entering the parabolic reflection surface 9 can be further diffused in the direction crossing with the direction in which the light advances (the leftward/ rightward direction of the light guide plate 3, direction crossing with the extending direction of the optical axis Ax) by the light diffuser 11 (the plurality of concave stripe sections 11a) formed at the parabolic reflection surface 9.

Figure 8A:
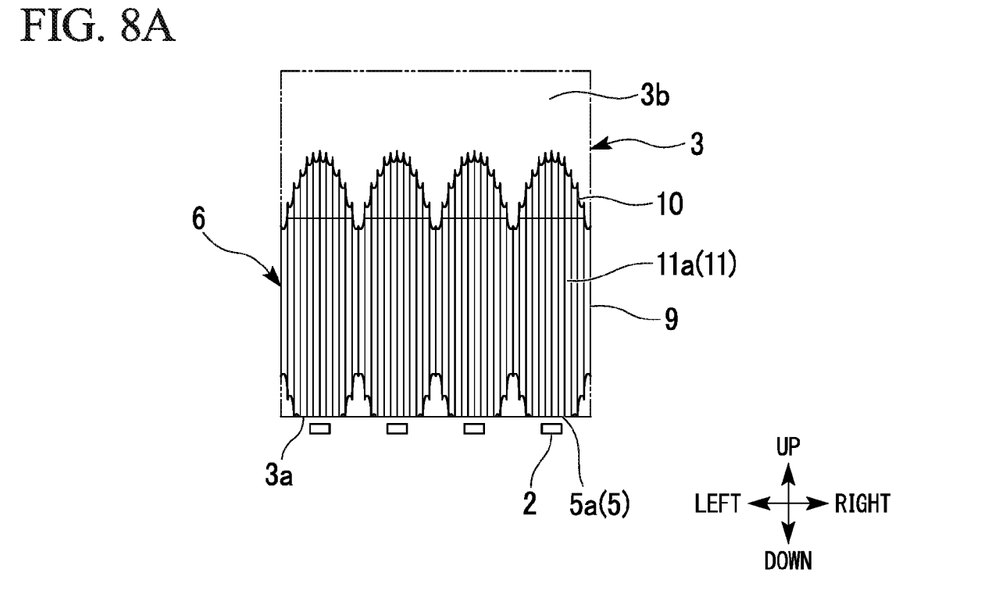
FIG. 8A is a plan view for explaining the arrangement of the parabolic reflection surface.
Figure 8B:
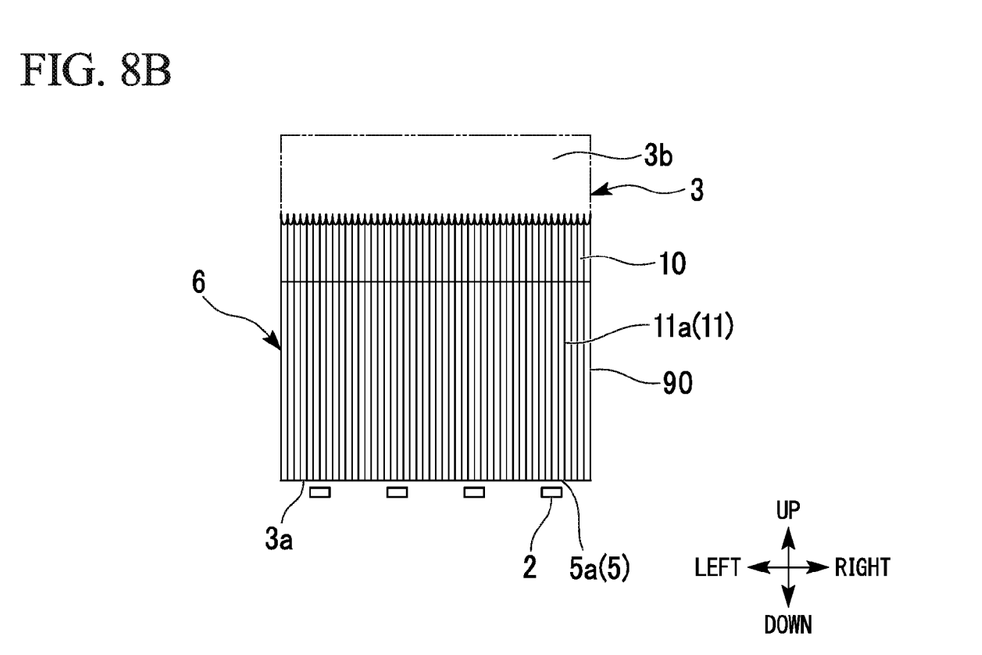
FIG. 8B is a plan view for explaining the arrangement of the parabolic reflection surface.

Here, disposition of the parabolic reflection surface 9 will be described with reference to FIG. 8A and FIG. 8B. Further, FIG. 8A is a plan view showing a configuration in which the plurality of parabolic reflection surface 9 are disposed to overlap each other as a variant. FIG. 8B is a plan view showing a configuration in which one continuous parabolic reflection surface 90 is disposed as a reference example.

Like the variant shown in FIG. 8A, the plurality of parabolic reflection surface 9 are disposed such that a part of the parabolic reflection surfaces overlap each other in the direction crossing with the direction in which the light L advances (the leftward/rightward direction of the light guide plate 3, direction crossing with the extending direction of the optical axis Ax). In this case, the neighboring light sources 2 can be disposed with a reduced interval therebetween.

Meanwhile, like the reference example shown in FIG. 8B, when the one continuous parabolic reflection surface 90 is disposed in the direction crossing with the direction in which the light L advances (the leftward/rightward direction of the light guide plate 3, direction crossing with the extending direction of the optical axis Ax), the parabolic reflection surface 90 cannot be formed in a shape curved along the direction crossing with the direction in which the light L advances (the leftward/rightward direction of the light guide plate 3, direction crossing with the extending direction of the optical axis Ax) to correspond to each of the light sources 2.

Accordingly, in the case of the above-mentioned configuration, the light L entering the parabolic reflection surface 90 is diffused in the direction crossing with the direction in which the light advances (the leftward/rightward direction of the light guide plate 3) by only the plurality of concave stripe section 11a formed at the parabolic reflection surface 90.

However, in the case of the above-mentioned configuration, unless the number of the light sources 2 is increased to narrow the interval of the neighboring light sources 2, there is a possibility that the so-called luminance (emission) nonuniformity in which portions of the light emitting surface D of the light guide plate 3 corresponding to the positions of the light sources 2 strongly glow in a linear pattern may become conspicuous.

Figure 9:
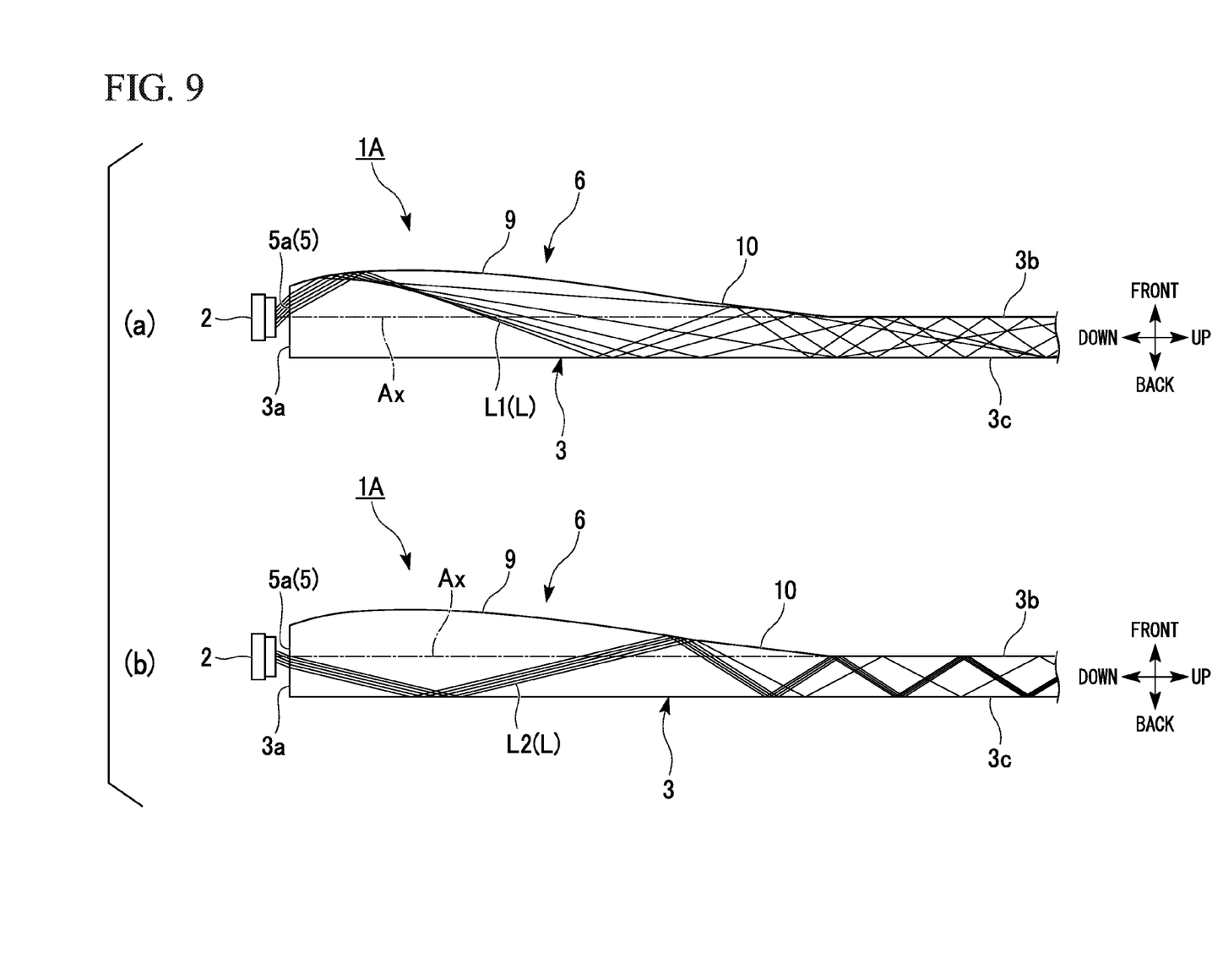
FIG. 9 is a view for explaining a light path of light entering a light guide plate from a light source.

A center of the optical axis Ax of the light source 2 facing the lower end surface 3a (the incident surface 5a) of the light guide plate 3 and the main surface (the front surface 3b, the first surface) of the light guide plate 3 are preferably disposed at levels close to each other with respect to a predetermined direction crossing the direction in which the light L advances. A position in the forward/backward direction (a predetermined direction perpendicular to the optical axis Ax) of the center of the optical axis Ax of the light source 2 facing the lower end surface 3a (the incident surface 5a) of the light guide plate 3 and a position in the forward/backward direction (a predetermined direction perpendicular to the optical axis Ax) of the main surface (the front surface 3b, the first surface) of the light guide plate 3 are preferably disposed at positions close to each other. As shown in FIGS. 9(a) and 9(b), the light source 2 is more preferably disposed such that the center of the optical axis Ax coincides with the main surface (the front surface 3b, the first surface) of the side at which the parabolic reflection surface 9 is formed in a state in which the light source 2 is facing the lower end surface 3a (the incident surfaces 5a) of the light guide plate 3. The center of the optical axis Ax of the light source 2 facing the lower end surface 3a (the incident surface 5a) of the light guide plate 3 and the main surface (the front surface 3b, the first surface) of the light guide plate 3 are more preferably disposed at levels equal to each other with respect to a predetermined direction crossing the direction in which the light L advances. A position in the forward/backward direction (a predetermined direction perpendicular to the optical axis Ax) of the center of the optical axis Ax of the light source 2 facing the lower end surface 3a (the incident surface 5a) of the light guide plate 3 and the position in the forward/backward direction (a predetermined direction perpendicular to the optical axis Ax) of the main surface (the front surface 3b, the first surface) of the light guide plate 3 are more preferably disposed at the same position. Further, FIG. 9(a) is a light path diagram of the light L1 emitted toward the parabolic reflection surface with a center of the optical axis Ax of the light source 2 being interposed therebetween. FIG. 9(b) is a light path diagram of the light L2 emitted toward an opposite side of the parabolic reflection surface with the center of the optical axis Ax of the light source 2 being interposed therebetween.

In this case, as shown in FIG. 9(a), in the light L radially emitted from the light source 2, the light L1 emitted toward the parabolic reflection surface with the center of the optical axis Ax of the light source 2 being interposed therebetween is reflected toward the reflection surface 7 by the parabolic reflection surface 9.

Meanwhile, as shown in FIG. 9(b), the light L2 emitted toward the opposite side of the parabolic reflection surface with the center of the optical axis Ax of the light source 2 being interposed therebetween is reflected toward the parabolic reflection surface 9 by the back surface 3c of the light guide plate 3 facing the parabolic reflection surface 9 and then reflected toward the reflection surface 7 by the parabolic reflection surface 9.

Accordingly, the light L (L1, L2) entering the incident surface 5a from the light source 2 can be efficiently guided toward the reflection surface 7 while being repeatedly reflected in the light guide plate 3.

As shown in FIG. 4 and FIG. 5, the reflection surface 7 is formed at either of one and the other main surface (in the embodiment, the back surface 3c) of the light guide plate 3. The reflection surface 7 is formed at the second surface (in the embodiment, the back surface 3c) of the light guide plate 3. Specifically, the reflection surface 7 has a plurality of reflection cuts 7a. The plurality of reflection cuts 7a are, among the back surface 3c of the light guide plate 3, formed throughout a region of an upper portion (the back side in the direction in which the light L advances) side rather than a region of a lower section (the front side in the direction in which the light L advances) side facing the plurality of parabolic reflection surfaces 9.

In the reflection surface 7, the light L reflected at the light reflection section 6 by the plurality of reflection cuts 7a is reflected toward the light emission surface 8 at an angle (an incident angle) smaller than a critical angle with respect to the front surface 3b of the light guide plate 3.

Further, the shapes, sizes, numbers, and so on of the reflection cuts 7a are not particularly limited as long as the reflection cuts 7a reflect the light L at similar angle as mentioned above. For example, in the embodiment, as shown in an enlarged manner in FIG. 5, the reflection cuts 7a are constituted by a groove section having a substantially triangular cross section.

As shown in FIG. 1, FIG. 4 and FIG. 5, the light emission surface 8 is formed at the other or the one main surface (in the embodiment, the front surface 3b) side of the light guide plate 3. The light emission surface 8 is formed at the first surface (in the embodiment, the front surface 3*b*) of the light guide plate 3. Specifically, the light emission surface 8 constitutes the light emitting surface D of the light guide plate 3 as described above in detail. The light emission surface 8 is formed throughout the region of the front surface 3*b* facing the reflection surface 7 (the plurality of reflection cuts 7*a*).

In the vehicle lamp 1A, the light L reflected at the reflection surface 7 (the plurality of reflection cuts 7*a*) from the light emission surface 8 is emitted to the outside of the light guide plate 3. Accordingly, the light can be emitted from the light emitting surface D of the light guide plate 3.

As described above, in the vehicle lamp 1A of the embodiment, as the plurality of light sources 2 are disposed in parallel along one end surface (the lower end surface 3*a*) of the light guide plate 3, reduction in thickness (reduction in size) of the vehicle lamp 1A can be achieved.

In addition, in the vehicle lamp 1A of the embodiment, the light L entering the incident surface 5*a* from the light source 2 can be efficiently guided toward the reflection surface 7 by the plurality of parabolic reflection surface 9 formed to correspond to each of the plurality of light source 2 while being repeatedly reflected inside the light guide plate 3.

Further, in the vehicle lamp 1A of the embodiment, the light L entering each of the incident surface 5*a* from the respective light source 2 can be diffused in the direction crossing with the direction in which the light L advances (the leftward/rightward direction of the light guide plate 3, direction crossing with the extending direction of the optical axis Ax) by the plurality of parabolic reflection surface 9. Accordingly, surface emission of the light emitting surface D of the light guide plate 3 can be substantially uniformly performed while occurrence of luminance (emission) non-uniformity when the plurality of light sources 2 are disposed in parallel can be suppressed.

Further, the present invention is not necessarily limited to the embodiment but various modifications may be made without departing from the scope of the present invention.

Figure 10:
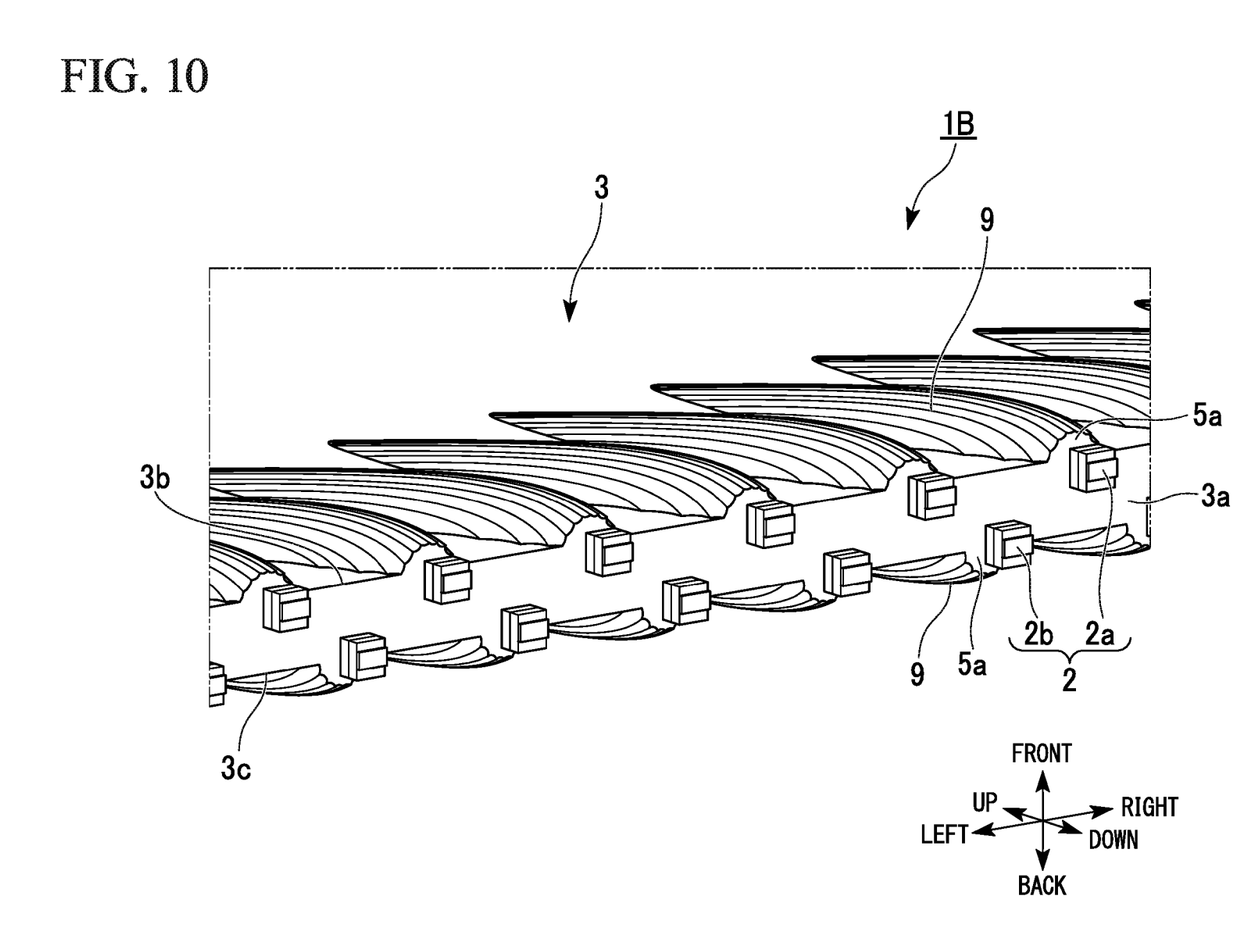
FIG. 10 is a perspective view of a major part showing another configuration example of the vehicle lamp.

Specifically, for example, the present invention may also have a configuration like a vehicle lamp 1B shown in FIG. 10. Further, FIG. 10 is a perspective view of a major part showing a configuration of the vehicle lamp 1B. In addition, in the following description, the same parts as the vehicle lamp 1A are designated by the same reference numerals in the drawings and description thereof will be omitted.

As shown in FIG. 10, the vehicle lamp 1B has a configuration in which the plurality of parabolic reflection surfaces 9 are formed at both of main surfaces (the front surface 3*b* and a back surface 3*b*, a first surface and a second surface) of the light guide plate 3 as the light reflection section 6.

In addition, the plurality of light sources 2 include a plurality of first light sources 2*a* and a plurality of second light sources 2*b* that emit light having different colors. The first light sources 2*a* and the second light sources 2*b* are disposed in parallel to each other in a direction along the lower end surface 3*a* of the light guide plate 3. In the embodiment, for example, LEDs configured to emit red light are used as the first light sources 2*a*, and LEDs configured to emit orange light are used as the second light sources 2*b*.

Among these, the first light source 2*a* is disposed such that the center of the optical axis Ax coincides with the front surface 3*b* while facing the incident surface 5*a* of the light guide plate 3. The center of the optical axis Ax of the first light source 2*a* facing the incident surface 5*a* of the light guide plate 3 and the front surface 3*b* (the first surface) of the light guide plate 3 may be disposed at the same level with respect to a predetermined direction crossing with the direction in which the light L advances. The position in the forward/backward direction (a predetermined direction perpendicular to the optical axis Ax) of the center of the optical axis Ax of the first light source 2*a* facing the incident surface 5*a* of the light guide plate 3 and the position in the forward/backward direction (a predetermined direction perpendicular to the optical axis Ax) of the front surface 3*b* (the first surface) of the light guide plate 3 may be disposed at the same position.

In addition, the center of the optical axis Ax of the first light source 2*a* facing the incident surface 5*a* of the light guide plate 3 and the front surface 3*b* (the first surface) of the light guide plate 3 may be disposed at levels close to each other with respect to a predetermined direction crossing with the direction in which the light L advances. The position in the forward/backward direction (a predetermined direction perpendicular to the optical axis Ax) of the center of the optical axis Ax of the first light source 2*a* facing the incident surface 5*a* of the light guide plate 3 and the position in the forward/backward direction (a predetermined direction perpendicular to the optical axis Ax) of the front surface 3*b* (the first surface) of the light guide plate 3 may be disposed at positions close to each other.

In addition, the parabolic reflection surfaces 9 at the front surface 3*b* side are formed to correspond to the first light sources 2*a*.

Meanwhile, the second light source 2*b* is disposed such that the center of the optical axis Ax coincides with the back surface 3*c* while facing to the incident surface 5*a* of light guide plate. The center of the optical axis Ax of the second light source 2*b* facing the incident surface 5*a* of the light guide plate 3 and the back surface 3*c* (the second surface) of the light guide plate 3 may be disposed at the same level with respect to a predetermined direction crossing with the direction in which the light L advances. The position in the forward/backward direction (a predetermined direction perpendicular to the optical axis Ax) of the center of the optical axis Ax of the second light source 2*b* facing the incident surface 5*a* of the light guide plate 3 and the position in the forward/backward direction (a predetermined direction perpendicular to the optical axis Ax) of the back surface 3*c* (the second surface) of the light guide plate 3 may be disposed at the same position.

In addition, the center of the optical axis Ax of the second light source 2*b* facing the incident surface 5*a* of the light guide plate 3 and the back surface 3*c* (the second surface) of the light guide plate 3 may be disposed at levels close to each other with respect to a predetermined direction crossing the direction in which the light L advances. The position in the forward/backward direction (a predetermined direction perpendicular to the optical axis Ax) of the center of the optical axis Ax of the second light source 2*b* facing the incident surface 5*a* of the light guide plate 3 and the position in the forward/backward direction (a predetermined direction perpendicular to the optical axis Ax) of the back surface 3*c* (the second surface) of the light guide plate 3 may be disposed at positions close to each other.

In addition, the parabolic reflection surface 9 of the back surface 3*c* side is formed to correspond to the second light source 2*b*.

In the vehicle lamp 1B having the above-mentioned configuration, as lighting of the first light source 2*a* and lighting of the second light source 2*b* are switched with each other, the light emitting surface D of the light guide plate 3 can emit light having different colors. In this case, for example, the vehicle lamp 1B may have a function as a tail lamp with lighting of red light and a function as a blinker lamp with flickering of orange light.

Further, while the light guide plate 3 has a configuration in which the parabolic reflection surfaces 9 (including the inclined reflection surface 10) are formed at the same side (the front surface 3*b* side) as the light emission surface 8 of the light guide plate 3, the light guide plate 3 is not limited to the above-mentioned configuration but may also have a configuration in which the parabolic reflection surfaces 9 are formed at an opposite side (the back surface 3*c* side) of the light emission surface 8 of the light guide plate 3.

In addition, while the light guide plate 3 has a configuration in which the light incidence section 5, the light reflection section 6, the reflection surface 7, and the light emission surface 8 are integrally provided, some of these may also be split. For example, the light guide plates 3 split between a portion that constitutes the light incidence section 5 and the light reflection section 6 and a portion that constitutes the reflection surface 7 and the light emission surface 8 may be integrally combined to form the light guide plate 3. In addition, the parabolic reflection surfaces 9 (including the inclined reflection surface 10) serving as a portion protruding from the main surface of the light guide plate 3 may be formed separately from the light guide plate 3, and then the parabolic reflection surfaces 9 may be integrally attached to the main surface of the light guide plate 3.

Further, while the case in which the present invention is applied to the above-mentioned vehicle lamp such as a tail lamp or the like has been exemplified in the embodiment, when the tail lamp is configured, in addition to the above-mentioned configuration, for example, the vehicle lamp may also be combined with another member such as an outer lens, an inner lens, a reflector, or the like.

In addition, the present invention is not limited to the vehicle lamp such as a tail lamp or the like but may be widely applied to vehicle lamps including a plurality of light sources and a light guide plate.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A vehicle lamp comprising:
a plurality of light sources; and
a light guide plate configured to guide light from the plurality of light sources,
wherein the light guide plate has a first surface formed as a plate surface, a second surface facing the first surface, and an end surface that connects the first surface and the second surface,
the plurality of light sources are disposed along the end surface of the light guide plate next to each other,
the end surface includes an incident surface to which the light endued from the plurality of light sources enters,
a light reflection section is formed in the first surface that reflects the light entered from the incident surface toward the second surface,
the light reflection section comprises a plurality of parabolic reflection surfaces arranged to respectively correspond to the plurality of light sources,
the plurality of parabolic reflection surfaces have shapes curved along a direction in which the light entered from the incident surface advances and also curved along a direction crossing with the direction in which the light entered from the incident surface advances, and have shapes in which a downward gradient is gentler than an upward gradient in the direction in which the light entered from the incident surface advances,
a thickness of the light guide plate is thicker at a portion in which a gradient of the light guide plate changes from the upward gradient to the downward gradient than a tip portion of the light guide plate in the direction in which the light entered from the incident surface advances, and
the plurality of parabolic reflection surfaces includes a light diffuser that diffuses light in the direction crossing with the direction in which the light entered from the incident surface advances.

2. The vehicle lamp according to claim 1,
wherein a center of an optical axis of the light source facing the one end surface of the light guide plate and the first surface of the light guide plate are disposed at levels close to each other with respect to the direction crossing with the direction in which the light entered from the incident surface advances.

3. The vehicle lamp according to claim 1,
wherein the light reflection section comprises an inclined reflection surface at more advanced side than the parabolic reflection surface in the direction in which the light entered from the incident surface advances.

4. The vehicle lamp according to claim 1,
wherein the light diffuser comprises a plurality of concave stripe sections extending in the direction in which the light entered from the incident surface advances, and
the plurality of concave stripe sections are formed next to each other in the direction crossing with the direction in which the light entered from the incident surface advances.

5. The vehicle lamp according to claim 1,
wherein the plurality of parabolic reflection surfaces are disposed in a state in which a part of the parabolic reflection surfaces overlap each other in the direction crossing with the direction in which the light entered from the incident surface advances.

6. A vehicle lamp comprising:
a plurality of light sources; and
a light guide plate configured to guide light from the plurality of light sources,
wherein the plurality of light sources are disposed in parallel along one end surface of the light guide plate,
the light guide plate has a first surface, a second surface, and a light reflection section formed at the first surface and configured to reflect light entered from the one end surface toward the second surface,
the light reflection section comprises a plurality of parabolic reflection surfaces arranged to respectively correspond to the plurality of light sources,
the parabolic reflection surfaces protrude from the first surface of the light guide plate and have shapes curved along a direction in which light entering from the one end surface advances and curved along a direction crossing with the direction in which the light entering from the one end surface advances,
the plurality of parabolic reflection surfaces are formed at the first surface and the second surface of the light guide plate, the plurality of light sources comprise a plurality of first light sources and a plurality of second light sources,
a center of an optical axis of the plurality of first light sources facing the one end surface of the light guide plate and the first surface of the light guide plate are disposed at levels close to each other with respect to the direction crossing with the direction in which the light entering from the one end surface advances,
a center of an optical axis of the plurality of second light sources facing the one end surface of the light guide plate and the second surface of the light guide plate are disposed at levels close to each other with respect to the direction crossing with the direction in which the light entering from the one end surface advances, and
the first light sources and the second light sources are disposed in parallel to each other in a direction along the one end surface of the light guide plate.

7. The vehicle lamp according to claim 6,
wherein the first light source and the second light source emit light having different colors with each other.

8. The vehicle lamp according to claim 1,
wherein each of the plurality of light sources is disposed at a distance from the one end surface of the light guide plate.

9. The vehicle lamp according to claim 2,
wherein the light diffuser comprises a plurality of concave stripe sections extending in the direction in which the light entered from the incident surface advances, and
the plurality of concave stripe sections are formed next to each other in the direction crossing with the direction in which the light entered from the incident surface advances.

10. The vehicle lamp according to claim 1,
wherein the plurality of parabolic reflection surfaces are formed at the first surface and the second surface of the light guide plate,
the plurality of light sources comprise a plurality of first light sources and a plurality of second light sources,
a center of an optical axis of the plurality of first light sources facing the one end surface of the light guide plate and the first surface of the light guide plate are disposed at levels close to each other with respect to the direction crossing with the direction in which the light entered from the incident surface advances,
a center of an optical axis of the plurality of second light sources facing the end surface of the light guide plate and the second surface of the light guide plate are disposed at levels close to each other with respect to the direction crossing with the direction in which the light entered from the incident surface advances, and
the first light sources and the second light sources are disposed in parallel to each other in a direction along the end surface of the light guide plate.

11. The vehicle lamp according to claim 1,
wherein the plurality of parabolic reflection surfaces has a symmetrical axis of a parabolic transition curve passing through the light sources that corresponds to the end surface, and the symmetrical axis is inclined so as to cross with the second surface of the light guide plate.

12. The vehicle lamp according to claim 2,
wherein the plurality of parabolic reflection surfaces has a symmetrical axis of a parabolic transition curve passing through the light sources that corresponds to the end surface, and the symmetrical axis is inclined so as to cross with the second surface of the light guide plate.

13. A vehicle lamp comprising:
a plurality of light sources; and
a light guide plate configured to guide light from the plurality of light sources,
wherein the light guide plate has a first surface formed as a plate surface, a second surface facing the first surface, and a plurality of end surfaces that connects the first surface and the second surface,
the plurality of light sources are disposed along one end surface, which is an end surface among the plurality of end surfaces of the light guide plate, next to each other,
the one end surface includes an incident surface to which the light emitted from the plurality of light sources enters,
a light reflection section is formed in the first surface that reflects the light entered from the incident surface toward the second surface,
the light reflection section comprises a plurality of parabolic reflection surfaces arranged to respectively correspond to the plurality of light sources,
the plurality of parabolic reflection surfaces have shapes curved along a direction in which the light entered from the incident surface advances and curved along a direction crossing with the direction in which the light entered from the incident surface advances,
a thickness of the light guide plate is thicker at a portion in which the parabolic reflection surface is provided than a tip portion of the light guide plate which is more advanced in the direction in which the light entered from the incident surface advances than the parabolic reflection surface,
the plurality of parabolic reflection surfaces includes a light diffuser that diffuses light in the direction crossing with the direction in which the light entered from the incident surface advances,
the light diffuser comprises a plurality of concave stripe sections extending in the direction in which the light entered from the incident surface advances, and
the plurality of concave stripe sections are formed next to each other in the direction crossing with the direction in which the light entered from the incident surface advances.

14. The vehicle lamp according to claim 13,
wherein each of the plurality of light sources is disposed at a distance from the one end surface of the light guide plate.

15. The vehicle lamp according to claim 13,
wherein a center of an optical axis of the light source facing the one end surface of the light guide plate and the first surface of the light guide plate are disposed at levels close to each other with respect to the direction crossing with the direction in which the light entered from the incident surface advances.

16. The vehicle lamp according to claim 1,
wherein a plurality of reflection cuts are provided in the first surface or the second surface at a position more separated from the incident surface than the parabolic reflection surface in the direction in which the light entered from the incident surface advances.

17. The vehicle lamp according to claim 2,
wherein a plurality of reflection cuts are provided in the first surface or the second surface at a position more separated from the incident surface than the parabolic reflection surface in the direction in which the light entered from the incident surface advances.

18. The vehicle lamp according to claim 4,
wherein the plurality of concave stripe sections have a concave surface shape having a substantially arc-shaped cross section.
19. The vehicle lamp according to claim 13,
wherein the plurality of concave stripe sections have a concave surface shape having a substantially arc-shaped cross section.
20. The vehicle lamp according to claim 13,
wherein intervals of the neighboring concave stripe sections are 0.5 to 2 mm.
21. The vehicle lamp according to claim 13,
wherein curvatures of the concave stripe sections are 0.6 to 4 mm.

\* \* \* \* \*